June 2, 1970  H. GÖTT ETAL  3,515,177
MESH WELDING MACHINE
Filed June 13, 1968  3 Sheets-Sheet 1
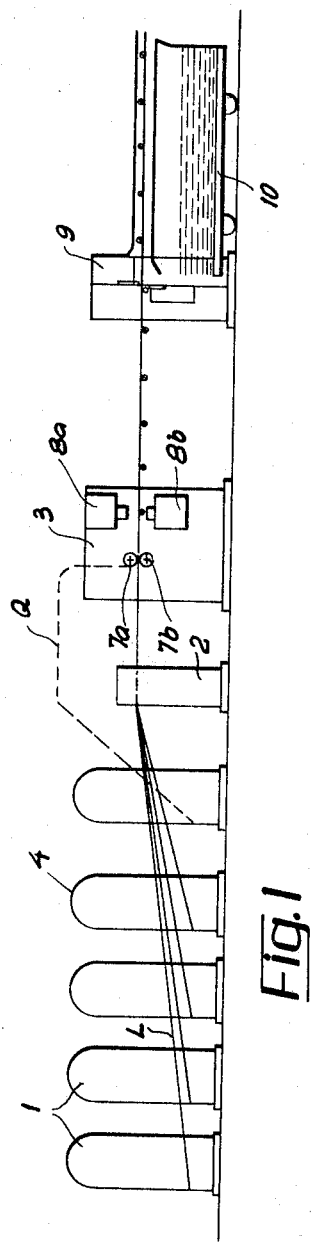
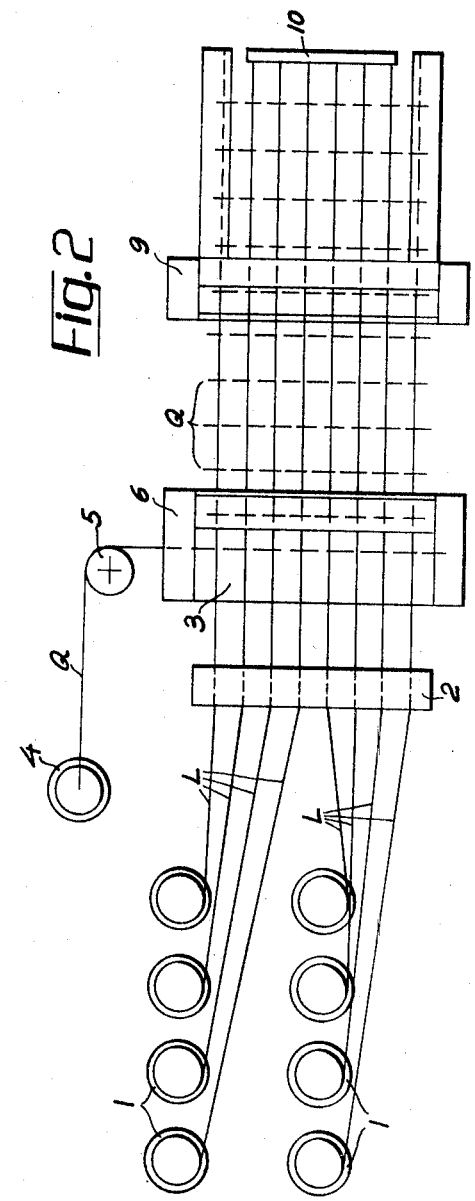
INVENTORS:
Hans Gött, Josef Ritter,
BY Gert Ritter and Klaus Ritter,
Ernst P. Marmorek,
Their Attorney.

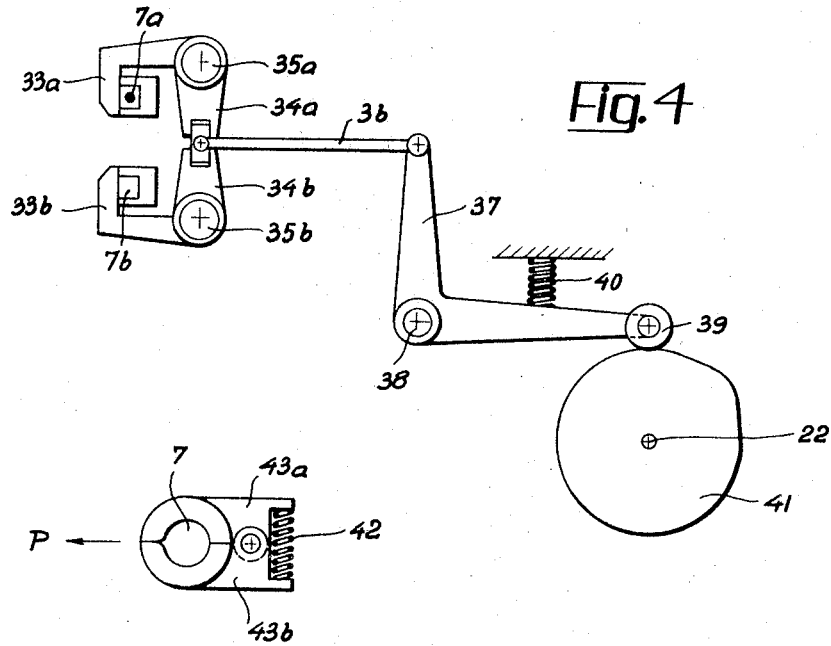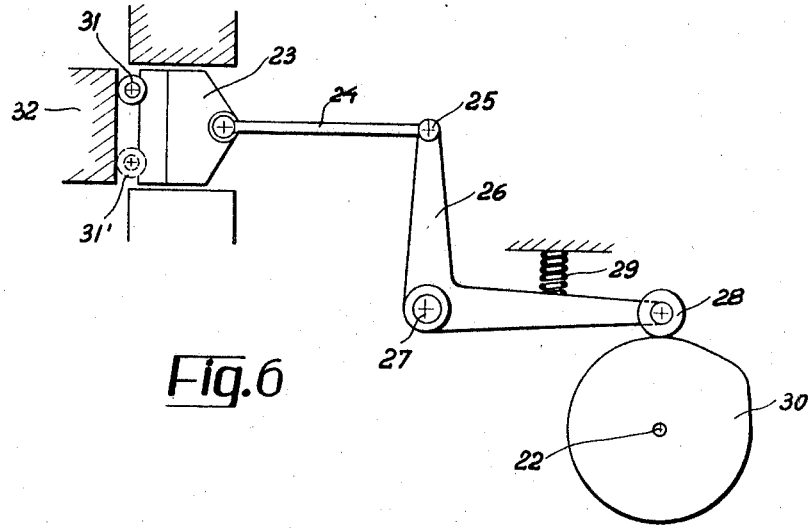

United States Patent Office 3,515,177
Patented June 2, 1970

3,515,177
MESH WELDING MACHINE
Hans Gött, Graz, Josef Ritter, Graz-Kroisbach, Gert Ritter, Graz, and Klaus Ritter, Graz-Kroisbach, Styria, Austria, assignors to EVG Entwicklungs- und Verwertungs-Gesellschaft m.b.H., Graz, Austria, a corporation of Austria
Filed June 13, 1968, Ser. No. 736,800
Claims priority, application Austria, June 16, 1967,
A 5,639/67
Int. Cl. B21f 27/10
U.S. Cl. 140—112                                    8 Claims

ABSTRACT OF THE DISCLOSURE

A machine for welding wire mesh of the kind in which longitudinal wires advancing longitudinally through the machine are welded at their crossing points to transverse wires inserted into the machine from the side is provided with a device for inserting the transverse wires comprising two parallel transverse wire guides extending across the machine, one guide extending on one side of the path of advance of the longitudinal wires and the other guide extending on the other side of the path of advance of the longitudinal wires and a single transverse wire insertion mechanism for feeding transverse wires into both the transverse wire guides. The delivery line of the insertion mechanism is aligned successively with the transverse wire guides on the two sides of the paths of the longitudinal wires by means of a switching wire guide which is situated between the insertion mechanism and the two transverse wire guides.

---

Figure 3:
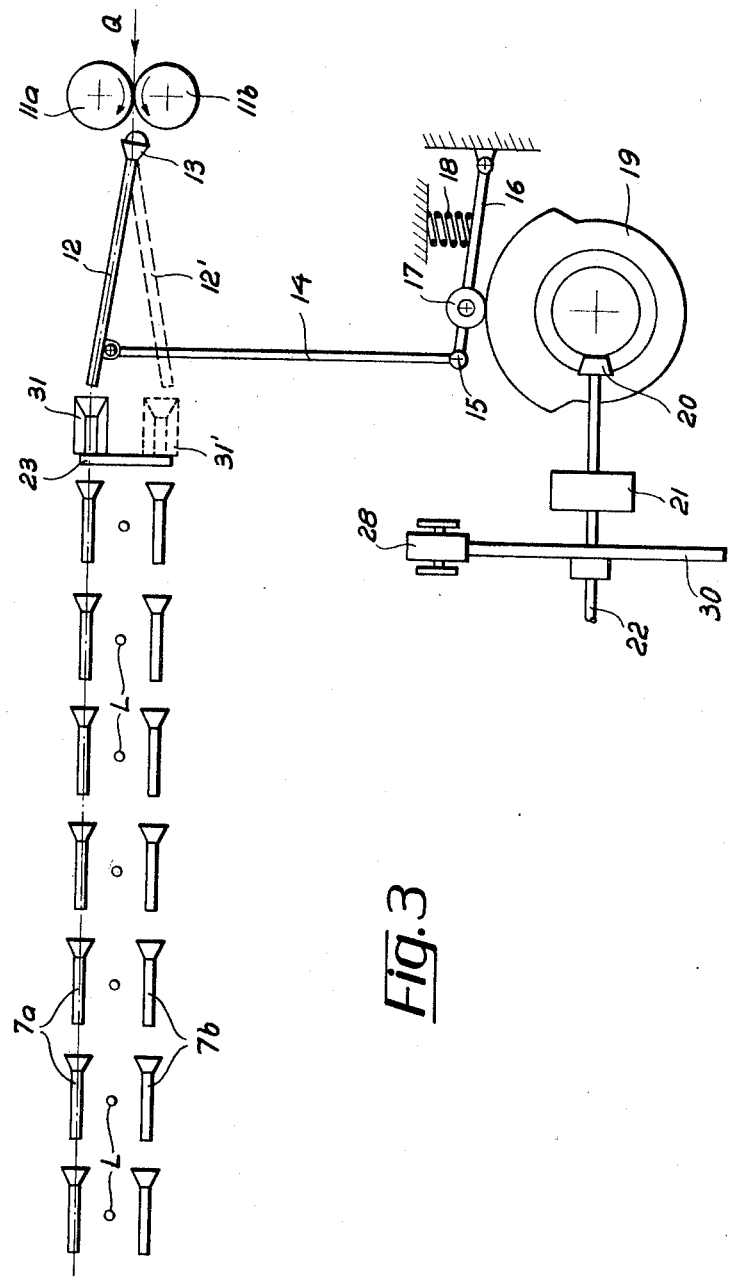

In the manufacture of wire mesh in wire mesh welding machines in which longitudinal wires advancing longitudinally through the machine are welded at their crossing points to transverse wires which are inserted, or "shot in," into the machine from the side, it is often desired to weld the transverse wires alternately to one side and then to the other side of the array of longitudinal wires.

For example, the welded mesh can have a tendency to warp, if all the transverse wires have been welded on one side of longitudinal wires. This warping tendency can be countered by welding the transverse wires alternately to one side and then to the other side of the array of longitudinal wires, or alternatively several transverse wires can be welded to one side, and then several to the other side. Wire mesh reinforcement for concrete is also known in which, in order to obtain a better anchorage of the mesh in the concrete, or to obtain a better distribution of the steel in the concrete, the transverse wires are welded alternately to the two sides of the array of longitudinal wires. Finally, it has already been proposed, for the manufacture of welded mesh which is cut off at intervals to form individual sheets of mesh, to weld the transverse wires to one side of the array of longitudinal wires to form the first sheet of mesh, and then weld the transverse wires to the other side of the array to form the next sheet, and so on. This gives an advantage when it comes to stacking the lengths of grating on top of each other, in that without it being necessary to turn each second length over through 180° before placing it upon the stack, the transverse wires of each sheet fit between those of a neighbouring sheet, with the result that the stack has less height. In this way the height of a stack can be reduced to about half of the height of a stack in which all the transverse wires are on the same side of the longitudinal wires.

In the manufacture of welded mesh, cut off into sheets, it is therefore often desired to insert the transverse wires sometimes above and sometimes below the array of longitudinal wires, which usually itself occupies a horizontal or almost horizontal plane. This makes it necessary for the transverse wires to be inserted at different heights. For this purpose it has hitherto been necessary to use two separate insertion mechanisms, one for inserting the transverse wires above the longitudinal wires, and the other for inserting them below. But this arrangement is comparatively costly and considerably complicates the construction of the welding machines.

The object of the present invention is to avoid these disadvantages and to this end, according to this invention, a mesh welding machine in which longitudinal wires advancing longitudinally through the machine are welded at their crossing points to transverse wires inserted into the machine from the side, has a device comprising two parallel transverse wire guides extending across the machine, one guide extending on one side of the path of advance of the longitudinal wires and the other guide extending on the other side of the path of advance of the longitudinal wires, and a single tranverse wire insertion mechanism for feeding transverse wires into both the transverse wire guides, the delivery line of the insertion mechanism being aligned successively with the transverse wire guides on the two sides of the path of the longitudinal wires, by means of a switching wire guide situated between the insertion mechanism and the two transverse wire guides.

In a preferred example of the invention, the transverse wire switching guide is in the form of a tube the inlet end of which is preferably flared to form a funnel, is pivoted on a pivot situated on the delivery line of the insertion mechanism and the other end of which is connected to a drive which moves the switching guide in alternation between two positions, so as to bring the outlet end of the switching guide alternately into line with the inlets of the two transverse wire guides.

An example of a wire mesh welding machine and a modification of this example, constructed in accordance with the invention are illustrated diagrammatically in the accompanying drawings in which:

FIG. 1 is a side view of one example;
FIG. 2 is a plan view of the example;
FIG. 3 shows the device for inserting the transverse wire, forming part of the machine shown in FIGS. 1 and 2;
FIG. 4 is a side view of the transverse wire guides in the region of the mesh welding machine, showing the drive for the mechanism which opens and closes the guides;
FIG. 5 is a side view of an alternative construction of an individual transverse wire guide; and
FIG. 6 shows a shear for cutting the transverse wires to length and also a drive for the shear.

In the mesh welding machine shown in FIGS. 1 and 2 longitudinal wires L are unwound from reels 1 and are fed, through a straightening device 2, to the welding part 3 of the machine. Each transverse wire Q is unwound from a reel 4 situated next to the welding part 3 of the machine, and is fed round a deflecting roller 5 to a transverse wire inserting device, which is mounted on a part 6 at the side of the machine. The inserting device inserts the transverse wires through either one of two alternatives wires guides 7a or 7b, the transverse wire being then cut off to length. The transverse wire is then conveyed along in the direction of the longitudinal wires, from the wire guide 7a or 7b as far as the line of welds between electrodes 8a, 8b of the welding machine. Here each transverse wire is welded to the longitudinal wires L at the crossing points. The welded mesh issues from the welding machine intermittently, and is cut off to length by a shear 9 to provide mesh sheets of the desired dimensions. The resulting individual sheets are stacked for example on a mobile support 10.

The transverse wires are inserted alternately first over the top of the longitudinal wires until one sheet is complete, and then underneath the longitudinal wires for the next sheet, with the result that the successive sheets are stacked to give a stack of less height than would be the case if the transverse wires were all on the same side of all the sheets.

The invention makes it unnecessary to provide separate inserting devices, one for inserting the transverse wires over the tops of the longitudinal wires, and the other for inserting them underneath. If two separate inserting devices were used they would have to be either staggered in position longitudinally, or to be positioned on opposite sides of the machine. Furthermore two separate inserting devices would have to be driven alternately by separate drives. These difficulties are overcome by the invention in that a single inserting device is used for inserting all the transverse wires. The inserting device inserts the wires alternately by means of a guiding device which switches back and forth between two alternative positions, and which feeds the wires through alternative systems of wire guides 7a and 7b.

The inserting mechanism itself, that is to say the mechanism which propels the transverse wires, can be of a known kind and is not itself part of the present invention. The preferred mechanism is that described in our British patent application No. 8749/67. This drive is represented symbolically in FIG. 3 by a pair of rollers 11a, 11b. These rollers feed the transverse wire Q, before it is cut off to length, transversely towards the welding machine.

After the inserting mechanism 11a, 11b there is a guide switching device in the form of a tube 12, which is flared at its inlet end in the form of a funnel. The switching tube 12 is mounted so as to pivot about a point 13 at its inlet end, this point 13 being situated on the insertion line of the rollers 11a, 11b, that is to say on their common tangent. Near its outlet end the switching tube 12 is pivoted to the end of a push rod 14, the other end 15 of which is pivoted to a control lever 16 equipped with a cam follower roller 17 which is pressed constantly against the surface of a disc cam 19 by a spring 18, which presses against the lever 16. The disc cam 19 is driven through a bevel gearwheel 20 and through a variable speed reduction gear 21 from a shaft 22 which is itself coupled to the main drive shaft of the machine, which actuates the advancing movement of the welded mesh. The disc cam 19 has a shape such that when it has rotated through 180° the switching tube 12 is swung over from the position shown in full lines into the position shown in broken lines in FIG. 3 of the drawings. When the disc cam has rotated through a further 180°, the guide tube 12 is moved back again into its initial position. The number of advancing steps performed by the welded mesh before the switching tube 12 is switched over can be adjusted by adjusting the ratio of the variable speed gear 21.

When the switching tube 12 is in either one of its two alternative positions, it is aimed in the direction of one or other of the guides 7a, 7b for the transverse wires. Each of the guides 7a and 7b consists of a series of short individual channels each of which is flared at its inlet end in the form of funnel. Between the individual guides there are intermediate gaps in which engage conveying devices for conveying the transverse wire from the insertion position towards the welding line between the electrodes of the welding machine.

Between the switching tube 12 and the wire guides 7a, 7b there is a shear 23 which is represented only diagrammatically in the drawing. As soon as the transverse wire has been inserted into the wire guides 7a, 7b it is cut off to length by the shear 23. The shear is actuated as shown in FIG. 6, by means of a thrust rod 24 which is pivoted at 25 to one arm of a bellcrank lever 26, which itself rocks about a pivot 27. On the end of the other arm of the bellcrank lever 26 there is a cam follower roller 28 which is thrust by a spring 29 constantly into contact with a disc cam 30. The spring 29 presses against the arm of the bellcrank lever 26. The disc cam 30 is mounted on the shaft 22, which is also shown in FIG. 3, at a point situated after the variable speed gear 21, to the effect that the transverse wire is cut to length each time the switching tube 12 switches over.

Between the switching tube 12 and the shear 23 there are guiding devices for guiding the end of the transverse wire, which is inclined in position, reliably into the horzontal guide 7a or 7b. In the example shown in the drawing the guide is in the form of a funnel 31 which is moved, by a drive not shown in the drawing, back and forth in synchronisation with the switching tube 12. When the switching tube 12 is in the position shown in full lines in the drawing, the funnel is in the position 31 to feed the wire into the guides 7a. On the other hand when the switching tube is in the position 12', the funnel is in the position 31', to feed the wire into the guides 7b. In this example of the invention the funnel 31 acts as the second blade for the shear 23. For this purpose the funnel is supported by a support 32.

The wire guides 7a, 7b are arranged as shown in FIG. 4, and consist of channels open at one side, the open sides being covered by plates 33a, 33b mounted on bellcrank levers 34a, 34b which are pivoted at 35a, 35b. The plates 33a, 33b are swung open and shut together by a connecting rod 36, the other end of which is pivoted to the end of a bellcrank lever 37, which itself is pivoted at 38. The end of the other arm of the bellcrank lever 37 supports a cam follower roller 39 which is pressed constantly by a spring 40 against the edge of a disc cam 41, mounted on the shaft 22. After each transverse wire has been inserted, the plates 33a, 33b are pivoted open to allow the wire to be conveyed longitudinally, in the direction of the longitudinal wires, to the welding line by the conveying means already mentioned.

Alternatively instead of the transverse wire guides being covered by a movable plate, if desired wire guides 7 as shown in FIG. 5 can be used. These consist of two half-tubes 43a, 43b hinged together so that they open by the thrust of the wires against them against the action of a spring 42. To allow the wire to be pushed more easily out of the wire guide in the direction of the arrow P, the jaws of the guide have rounded lips.

We claim:

1. In a mesh welding machine of the kind comprising means for advancing longitudinal wires longitudinally through said machine, means for inserting transverse wires into the machine from one side thereof and means for welding said longitudinal wires to said transverse wires at the crossing points of said longitudinal and transverse wires, the improvement wherein said means for inserting said transverse wires comprises two parallel transverse wire guides extending across said machine, means mounting one of said transverse wire guides on one side of the path of advance of said longitudinal wires, means mounting the other of said transverse wire guides on the other side of the path of advance of said longitudinal wires, a single transverse wire insertion mechanism for feeding transverse wires into both said transverse wire guides and a switching wire guide situated between said insertion mechanism and said two transverse wire guides for aligning the delivery line of said insertion mechanism successively with each of said transverse wire guides on the two sides of said path of advance of said longitudinal wires.

2. A machine as claimed in claim 1, wherein said switching wire guide comprises a tube having an inlet end and an outlet end, means pivotally mounting said inlet end of said tube on the delivery line of said insertion mechanism and drive means connected to said outlet end of said tube for moving said switching guide tube in alternation between two positions in one of which said outlet end of said tube is in line with the inlet of one of said two transverse wire guides and in the other of which the outlet end of said tube is in line with the other of said two transverse wire guides.

3. A machine as claimed in claim 1, further comprising a shear between the outlet end of said switching guide and the inlet ends of said two transverse wire guides, means mounting said shear extending across the paths of said transverse wires to said two transverse wire guides and automatic drive means for actuating said shear.

4. A machine as claimed in claim 3, further comprising a guiding device for guiding said transverse wires issuing from said switching guide into either one of said transverse wire guides and means mounting said guiding device between the outlet end of said switching guide and said shear.

5. A machine as claimed in claim 4, wherein said guiding device comprises a funnel and means for moving said funnel in synchronisation with the outlet end of said switching guide.

6. A machine as claimed in claim 1, wherein each of said transverse wire guides comprises a series of individual guides and means mounting said individual guides spaced apart with gaps between them, said gaps in one of said transverse wire guides being above said gaps in the other of said transverse wire guides, and conveying means for conveying said transverse wires from the delivery line of said insertion mechanism to said welding means, said conveying means engaging with said transverse wires in said gaps.

7. A machine as claimed in claim 6, wherein each of said individual transverse wire guides comprises a channel having an opening at one side, plate means covering said opening and means for automatically displacing said plate means after the insertion of each transverse wire by said insertion mechanism to open said channel.

8. A machine as claimed in claim 6, wherein each of said individual transverse wire guides comprises two half tubes, means hingedly connecting said two half tubes to each other, spring means resiliently holding said half tubes together and means responsive to the movement of said transverse wires by said conveying means to move said half tubes apart from each other against the action of said spring to release said transverse wires from said half tubes.

References Cited

UNITED STATES PATENTS 1,485,827    3/1924    Bull _____ 140—3

LOWELL A. LARSON, Primary Examiner